# 2,936,289

WATER TREATING COMPOSITION

Richard C. Harshman, Kenmore, and Robert L. Holbrook, Tonawanda, N.Y., assignors to Olin Mathieson Chemical Corporation, a corporation of Virginia No Drawing. Application May 5, 1955
Serial No. 506,384

9 Claims. (Cl. 252—181)

This invention relates to a novel composition of matter, its preparation and use. More particularly it relates to a composition in the form of pellets or tablets containing a hydrazinium salt and to methods of preparing and using these pellets.

The hydrazinium salts are usually powders or crystalline solids not amenable for use directly in tablet feeders which are commonly used for introducing minor proportions of less readily water-soluble materials into flowing streams of water such as boiler feed water. The hydrazinium salts are frequently too soluble, disintegrate or for various reasons cannot be introduced at a constant rate in small proportions, of the order of parts per million, into the feed water.

By diluting the hydrazinium salts with a wide variety of materials and pelletizing, it is possible to utilize the salts to introduce any desired proportion of hydrazinium salt into a flowing stream of water. By passing a stream of water over a bed of pellets, the hydrazinium salt dissolves from the tablet at a slow rate even though the salt itself may be very soluble in water. By controlling the proportion of dihydrazine phosphate, for example, in tablets and the rate of flow of water over a bed of the tablets, an effluent stream containing as little as 0.2 parts per million or less of hydrazinium ion or as much as several hundred parts per million can be obtained.

Hydrazinium salts of an acid of phosphorous, such as phosphates and phosphites, are especially appropriate salts of hydrazine for use in preparing the pelletized compositions of the present invention. Monohydrazinium phosphate, $N_2H_5 \cdot H_2PO_4$, has been known since it was first prepared apparently by Sabanejeff in 1898 (Z. anorg. Chem. 17, 480–93). Dihydrazinium phosphate is apparently not described in the literature of the art. It can be prepared by mixing one molecular proportion of the acid with two of the base in the methanol, removing the precipitated salt and vacuum drying. It is a fine, white, hygroscopic powder, very soluble in water. It is not suitable per se for feeding to a flowing stream of water entering a boiler, for example, in a dissolver, without elaborate proportioning pumps or other devices for controlling the rate of application and maintaining it constant.

Other hydrazinium salts of acids of phosphorus suitable for use according to the present invention include hydrazinium dihypophosphite, monohydrazinium phosphite, dihydrazinium phosphate, monohydrazinium metaphosphate and tetrahydrazinium pyrophosphate. Other hydrazinium salts of inorganic acids can be used, for example, hydrazinium borate and salts of organic acids, for example, dihydrazinium oxalate and dihydrazinium tartrate. Analogous salts of substituted hydrazines can be used including unsymmetrical dimethylhydrazinium salts, for example, unsymmetrical dimethylhydrazinium phosphate.

In addition, other solid derivatives which furnish hydrazinium or hydrazine ions or which are substituted hydrazine derivatives and have similar water treating utility can be used to form pellets according to the present invention. Hydrazides, for example, formhydrazide or acethydrazide; hydrazino acids, for example, alpha-hydrazino propionic acid; salts of weak acids, for example, hydrazinium carbazinate and corresponding derivatives of substituted hydrazines, for example, alpha-dimethylhydrazinopropionic acid can be used. Alkyl hydrazines of sufficiently high molecular weight to be solids, for example, lauryl hydrazine can also be used.

The tableted compositions of the present invention can be prepared by mixing the finely powdered hydrazinium salt with any suitable water-soluble material not deleterious to a boiler, generally a sodium or potassium salt, and a small amount of binder or lubricant and pressing into tablets. Preferably the water-soluble salt or salts used in preparing the tablets or pellets are useful as such in boiler water treatment, since when the tablets or pellets are so prepared it is possible to carryout an entire or complete water treatment in one operation instead of several. The tablets or pellets, and particularly the proportion of components therein, can be modified as desired to treat a given water supply to provide an effluent suitable for boiler use.

The water-soluble salt can be either inorganic or organic. Suitable salts for compounding with the hydrazinium salts include soda ash, sodium silicate, trisodium phosphate, tannin compounds, barium salts, morpholine and other organic amines, naphthalene sulfonic acids and their salts, and lignin sulfonic acid salts. Sodium sulfite or bisulfite can be used. Also useful, are caustic soda, sodium fluoride, potassium chromate, sodium aluminate, gelatin and similar materials.

Suitable binding agents include salts of fatty acids, for example, zinc stearate, or hydrazinium distearate or fatty acid hydrazides, for example, stearic monohydrazide. The binders, when employed, are usually used in relatively minor amounts, for example, from about 1 to 5 percent by weight based upon the weight of the tablet or pellet. The tablets can be formulated containing various amounts of the hydrazinium salt and inorganic salts. Useful tablets can be prepared containing from one to 80 percent by weight of the hydrazinium salt and 20 to 99 percent by weight of the water-soluble salt.

If desired, the tablets or pellets of our invention can also include as optional ingredients any of a wide variety of materials useful in boiler water treatment, for example, anti-foaming agents, such as silicones or the condensation products of ethylene oxide with primary or secondary amines described in United States Patent 2,701,239.

In treating large quantities of water with solid chemicals, a convenient method of addition is the use of a tablet feeder, for examples, the ones described in U.S. Patent 2,700,651 and application Serial No. 298,091, filed July 10, 1952, now U.S. Patent No. 2,738,323, in which a stream of water is passed over a bed of treating chemicals in the form of slow-dissolving tablets. It is important that these tablets be so formulated as to dissolve at a constant, slow rate and that they dissolve completely. Depending on the dosage required and the solution rate of the tablets, the entire quantity of water to be treated can be passed through the bed of tablets, or, as is usually the case, a portion of the water to be treated is passed through the treating device and this stream is recombined with the entire quantity to be treated. Control of the dosage can thus be obtained by formulating the tablets to obtain the desired solution rate and by varying the ratio of the quantity of water passed through the tablet feeder to the quantity to be treated.

*Example I*

Dihydrazinium phosphate was prepared by charging 44.2 pounds of 94.2 percent hydrazine and 221 pounds of methanol to a 50 gallon glass lined, jacketed kettle fitted with stirrer and reflux condenser. The mixture was cooled by circulating water in the jacket and 75 pounds of 85 percent by weight phosphoric acid was added slowly with continued cooling and agitation. The temperature was maintained at about 35° C. and some refluxing occurred. After the addition of the phosphoric acid was complete, the mixture was stirred for 15 additional minutes and then the slurry was filtered on a ceramic filter. The product was transferred to a vacuum shelf drier and dried for 17 hours at 120° F. in a 29 inch (mercury) vacuum. The fine, very hygroscopic powder melted at 128–132° C. When the entire batch is transferred promptly from the filter to the drier with minimum contact with air, the yield is about 95 percent of theory.

A powder mixture was prepared by intimately blending 25 parts by weight of the vacuum dried dihydrazinium phosphate, 72 parts by weight of fine sodium bisulfite and 3 parts by weight of stearic monohydrazide. The mixture was pressed at 5000 p.s.i.g. into 5.5 gram tablets measuring 2.5 x 0.5 millimeters. When one of the tablets was immersed in two liters of water at 28° and slowly stirred, it required about seven hours for complete solution.

In a further test, one of the tablets was anchored in a stream of flowing water. The hydrazine content of the effluent stream was determined at hourly intervals and for five hours it remained substantially constant at about 0.2 part per million of hydrazinium ion. This stream was suitable for feeding to a boiler.

*Example II*

A powder mixture was prepared by intimately mixing 50 parts by weight of vacuum dried dihydrazinium phosphate, 47 parts by weight of sodium bisulfite and 3 parts by weight of stearic monohydrazide. This was pressed into tablets under 5000 p.s.i.g. One of the tablets was anchored in a flowing stream of water and the hydrazinium content of the water was measured at hourly intervals. After one hour the stream contained 260 parts per million of hydrazinium ion and after two hours 303 parts per million of hydrazinium ion.

*Example III*

A powder mixture was prepared from 25 parts by weight of vacuum dried dihydrazinium phosphate, 72 parts by weight of trisodium phosphate and 3 parts by weight of stearic monohydrazide. The powder was pressed into tablets at 5000 p.s.i.g. One of the tablets stirred with 2 liters of water at 28° C. required about one hour for complete solution.

*Example IV*

Tablets were prepared by compressing at 5000 p.s.i.g. a powder mixture of 25 parts by weight of vacuum dried dihydrazinium phosphate, 72 parts by weight of sodium chloride and 3 parts by weight of zinc stearate. One of the tablets stirred in two liters of water at 28° C. dissolved completely in about 4 hours.

*Example V*

Tablets were prepared by pressing at 5000 p.s.i.g. a powder mixture of 50 parts by weight of dihydrazinium phosphate, 47 parts by weight of sodium chloride and 3 parts by weight of zinc stearate. The dissolving time of one tablet in two liters of slowly stirred water at 28° C. was about 2 hours.

*Example VI*

Tablets were prepared by pressing at 5000 p.s.i.g. a powder mixture of 75 parts by weight of vacuum dried dihydrazinium phosphate, 22 parts by weight of sodium chloride and 3 parts by weight of zinc stearate. The dissolving time of one tablet in two liters of water, slowly stirred, at 28° C. for about 3 hours.

*Example VII*

A homogeneous powder mixture of 25 parts by weight of dihydrazinium oxalate, 72 parts by weight of anhydrous sodium carbonate and 3 parts by weight of hydrazinium distearate was pressed into 5.5-gram tablets at 5000 p.s.i.g. The hydrazinium distearate was prepared by homogeneously mixing one molecular proportion of anhydrous hydrazine with two molecular proportions of stearic acid heated to just above its melting point and then cooling. One tablet was anchored in a stream of water at 20° C. flowing at a rate of about 5 to 6 milliliters per minute. The effluent water was analyzed at intervals for hydrazine content with the following results:

| Elapsed minutes: | Hydrazine, p.p.m. |
|---|---|
| 40 | 14 |
| 113 | 26 |
| 180 | 15 |
| 255 | 42 |
| 300 | 2 |

The data show that this tablet was effective for about 4 hours under these conditions.

Another tablet was anchored in a stream of water flowing at the same rate but at a temperature of 50 to 60° C. The tablet dissolved in a little over 3 hours, introducing hydrazine at a higher rate as shown below:

| Elapsed minutes: | Hydrazine, p.p.m. |
|---|---|
| 40 | 113 |
| 113 | 140 |
| 180 | 182 |
| 275 | 5 |

*Example VIII*

A homogeneous powder mixture of 25 parts by weight of hydrazinium dihypophosphite, 72 parts of anhydrous sodium acetate and 3 parts of hydrazinium distearate was pressed into 5.5-gram tablets at 5000 p.s.i.g. One of these tablets was anchored in a stream of water flowing at a rate of 5 to 6 milliliters per minute. The effluent water was analyzed at intervals for hydrazine content with the following results:

| Elapsed minutes: | Hydrazine, p.p.m. |
|---|---|
| 40 | 1 |
| 113 | 5 |
| 180 | 2 |
| 300 | 2 |
| 360 | 2 |
| 420 | 6 |

The data show that this tablet was effective for over 7 hours under these conditions.

*Example IX*

A homogeneous powder mixture of 25 parts by weight of monohydrazinium phosphate, 72 parts by weight of anhydrous sodium acetate and 3 parts by weight of hydrazinium distearate was pressed into 5.5-gram tablets at 5000 p.s.i.g. One of these tablets was anchored in a stream of water flowing at a rate of 5 to 6 milliliters per minute. The effluent water was analyzed at intervals for hydrazine content with the following results:

| Elapsed minutes: | Hydrazine, p.p.m. |
|---|---|
| 40 | 3 |
| 113 | 2 |
| 180 | 4 |
| 255 | 5 |
| 360 | 5 |
| 420 | 4 |

The data show that this tablet was effective for over 7 hours under these conditions.

The following is an example of a pelletized composition suitable for boiler water treatment and containing several boiler water treating components, including dihydrazine phosphate:

Example X

| | Weight percent |
|---|---|
| Dihydrazine phosphate | 1.0 |
| Soda ash | 40.0 |
| Trisodium phosphate | 19.0 |
| Sodium silicate | 24.0 |
| Zinc stearate | 1.0 |
| Tannin extracts | 15.0 |
| | 100.0 |

We claim:

1. A tablet or pellet suitable for use in the treatment of boiler feed water consisting essentially of from 1 to 80 percent by weight of a hydrazinium salt, 1 to 5 percent by weight of a binding agent selected from the group consisting of zinc stearate, hydrazinium distearate, and stearic monohydrazide, and the balance of at least one material selected from the group consisting of trisodium phosphate, sodium carbonate, sodium silicate, sodium chloride, sodium acetate, sodium bisulfite and tannin extract.

2. A composition according to claim 1 in which said hydrazinium salt is a phosphate.

3. A composition according to claim 1 in which said hydrazinium salt is a phosphite.

4. A composition according to claim 1 consisting essentially of about 25 percent by weight of dihydrazinium sulfate, about 72 percent by weight of sodium bisulfite and about 3 percent by weight of stearic monohydrazide.

5. A composition according to claim 1 consisting essentially of about 50 percent by weight of dihydrazinium sulfate, about 47 percent by weight of sodium bisulfite and about 3 percent by weight of stearic monohydrazide.

6. A composition according to claim 1 consisting essentially of about 25 percent by weight of dihydrazinium phosphate, about 72 percent of trisodium phosphate and about 3 percent by weight of stearic monohydrazide.

7. A composition according to claim 1 consisting essentially of about 25 percent by weight of dihydrazinium oxalate, about 72 percent by weight of sodium carbonate and about 3 percent by weight of hydrazinium distearate.

8. A composition according to claim 1 consisting essentially of about 25 percent by weight of hydrazinium dihypophosphite, about 72 percent by weight of anhydrous sodium acetate and about 3 percent by weight of hydrazinium distearate.

9. A composition according to claim 1 consisting essentially of about 25 percent by weight of dihydrazinium phosphate, about 72 percent by weight of sodium chloride and about 3 percent by weight of zinc stearate.

References Cited in the file of this patent

UNITED STATES PATENTS

| | | |
|---|---|---|
| 1,877,504 | Grebe et al. | Sept. 13, 1932 |
| 2,043,257 | Missbach | June 9, 1936 |
| 2,238,651 | Keenen | Apr. 15, 1941 |
| 2,318,606 | Goebel et al. | May 11, 1943 |
| 2,318,663 | Bird et al. | May 11, 1943 |
| 2,488,832 | Rossi | Nov. 22, 1949 |
| 2,544,772 | Audrieth et al. | Mar. 13, 1951 |
| 2,576,386 | Bird | Nov. 27, 1951 |
| 2,582,138 | Lane | Jan. 8, 1952 |
| 2,739,871 | Senkus | Mar. 27, 1956 |

OTHER REFERENCES

Mann et al.: Ind. and Eng. Chem., February 1936, p. 160.

Corrosion—Causes and Prevention, 3rd ed., by Speller, pub. by McGraw-Hill, New York (1951), p. 424.

Chemistry of Hydrazine by Audrieth et al., John Wiley & Sons, New York (1951), pp. 55, 105, 177, 266 and 227.

Chemical Week, October 17, 1953, p. 16.